(12) United States Patent
Seetharaman et al.

(10) Patent No.: US 11,892,993 B2
(45) Date of Patent: Feb. 6, 2024

(54) TECHNIQUES FOR EFFICIENT COMPUTE RESOURCE HARVESTING

(71) Applicant: Oracle International Corporation, Redwood Shores, CA (US)

(72) Inventors: Ganesh Seetharaman, Redwood Shores, CA (US); Robert Costin Velisar, Belmont, CA (US); Yuen Sheung Chan, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 742 days.

(21) Appl. No.: 17/036,345

(22) Filed: Sep. 29, 2020

(65) Prior Publication Data

US 2022/0100568 A1    Mar. 31, 2022

(51) Int. Cl.
*G06F 16/00* (2019.01)
*G06F 16/22* (2019.01)

(52) U.S. Cl.
CPC ............... *G06F 16/2228* (2019.01)

(58) Field of Classification Search
CPC ................ G06F 16/2228; G06F 16/906
See application file for complete search history.

(56) References Cited

U.S. PATENT DOCUMENTS

| 10,986,065 B1 | 4/2021 | Farhangi et al. |
| 2005/0262482 A1* | 11/2005 | Wagner ............... G06F 8/71 717/118 |
| 2018/0314531 A1* | 11/2018 | Rhodes ............... G06F 9/4492 |
| 2019/0265996 A1 | 8/2019 | Shevade et al. |

OTHER PUBLICATIONS

U.S. Appl. No. 17/036,219, "First Action Interview Pilot Program Pre-Interview Communication", dated Apr. 14, 2022, 4 pages.

* cited by examiner

*Primary Examiner* — Thu Nguyet T Le
(74) *Attorney, Agent, or Firm* — Kilpatrick Townsend & Stockton LLP

(57) ABSTRACT

The present disclosure relates to a system and techniques for resolving dangling references resulting from a dependency relationship between computing resource objects uncovered during a harvesting process. In embodiments, a harvester application adds computing resource objects associated with a client to a resource collection as those computing resource objects are identified. Dependencies are identified as each computing resource object is added to the resource collection, which are resolved only if the computing resource objects associated with those dependencies have already been added to the resource collection. If the computing resource objects associated with the dependencies have not already been added to the resource collection, then the dependency is added to an observer pool. Observer modules are configured to check each computing resource object as it is processed during the harvest process in order to match those computing resource objects to unresolved dependencies.

20 Claims, 11 Drawing Sheets

TECHNIQUES FOR EFFICIENT COMPUTE RESOURCE HARVESTING

CROSS-REFERENCE TO RELATED APPLICATIONS

This application is related to application Ser. No. 17/036,219, filed Sep. 29, 2020, entitled "ISOLATED CELL ARCHITECTURE FOR CLOUD COMPUTING PLATFORM," the entire contents of which is hereby incorporated by reference as if fully set forth herein, under 35 U.S.C. § 120.

BACKGROUND

Cloud-based platforms have become increasingly common for end-to-end data management in database systems, such as Extract-Transform-Load (ETL) database systems. Such cloud-based platforms may offer entire suites of cloud solutions built around a customer's data. However, customers are frequently hampered in their ability to exploit available cloud-based resources due to insufficient information about what resources are available, how useful and up-to-date the resources are, what capabilities the resource provides to the business, and how data is impacted by the resources.

Embodiments address these and other problems, individually and collectively.

BRIEF SUMMARY

Techniques are provided (e.g., a method, a system, non-transitory computer-readable medium storing code or instructions executable by one or more processors) for providing resolution of dependencies between computing resource objects during a harvest process. In some examples, computing resource objects may be data resources (e.g., data asset resources). Data asset resources are any elements (e.g., hardware, software, or a combination) configured to store data (e.g., databases, object storage, storage drives and storage drive services, block volumes, file systems, big data clusters, data or metadata repositories, data dictionaries, etc. Various embodiments are described herein, including methods, systems, non-transitory computer-readable storage media storing programs, code, or instructions executable by one or more processors, and the like.

One embodiment is directed to a method performed by a harvester application that includes generating, by a collection module of a harvester application, a computing resource collection for a client from a catalog of computing resource objects by, for each computing resource object in the catalog of computing resource objects upon determining that the computing resource object is associated with the client: adding the computing resource object to the computing resource collection; identifying one or more dependencies for the computing resource object; and determining at least one unresolved dependency from the one or more dependencies, and resolving, by an observer module of the harvester application, the at least one unresolved dependency upon detecting that the collection module has added at least one second computing resource object associated with the unresolved dependency to the computing resource collection.

Another embodiment is directed to a computing device comprising a processor; and a memory including instructions that, when executed with the processor, cause the computing device to generate a computing resource collection for a client from a catalog of computing resource objects by, for each computing resource object in the catalog of computing resource objects upon determining that the computing resource object is associated with the client: adding the computing resource object to the computing resource collection; identifying one or more dependencies for the computing resource object; and determining at least one unresolved dependency from the one or more dependencies, and resolve the unresolved dependency upon detecting that the collection module has added at least one second computing resource object associated with the unresolved dependency to the computing resource collection.

The foregoing, together with other features and embodiments will become more apparent upon referring to the following specification, claims, and accompanying drawings.

DETAILED DESCRIPTION

Figure 1:
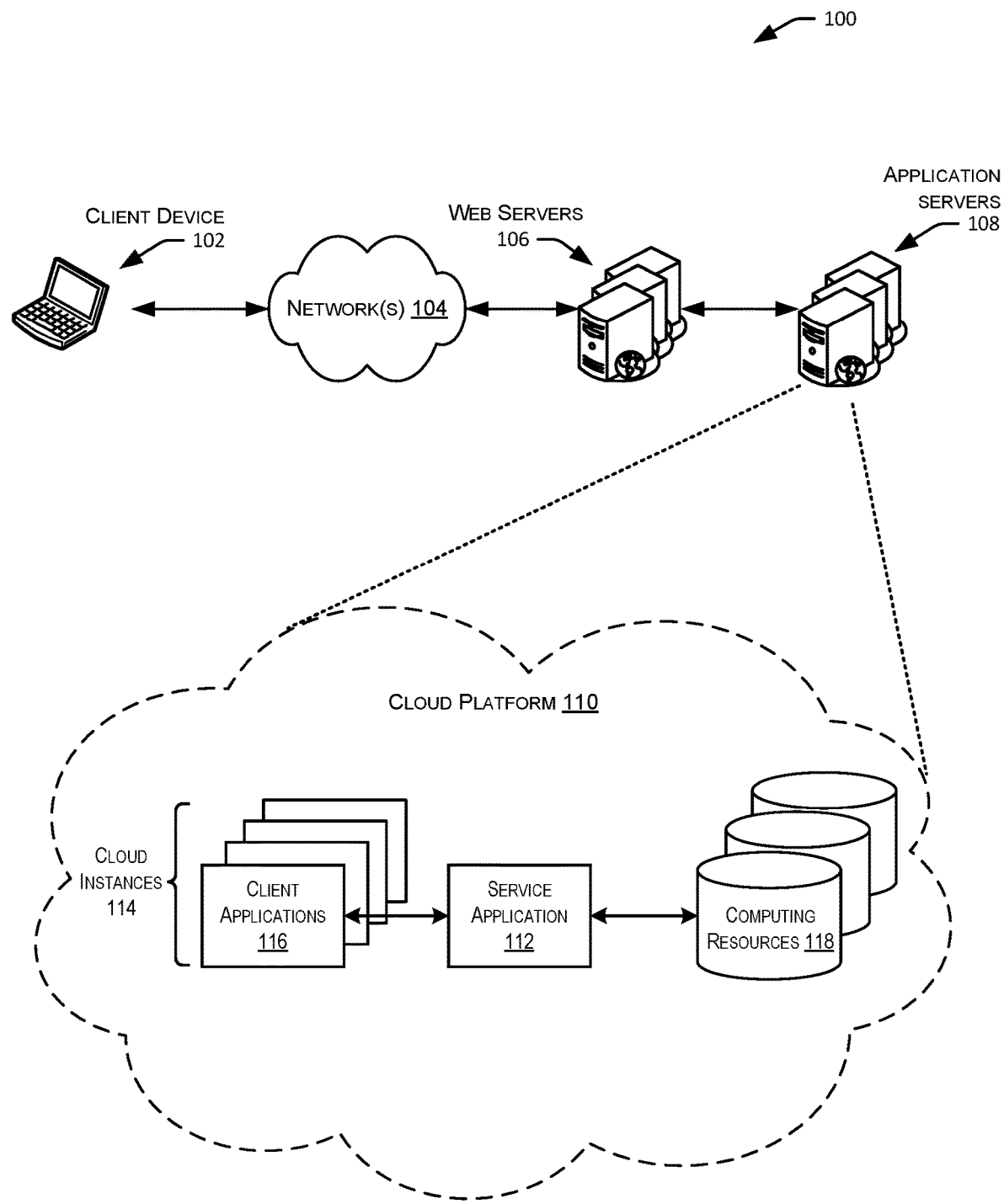
FIG. 1 depicts an illustrative system in which embodiments may be implemented in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to a system and techniques for resolving "unresolved" or "dangling" references resulting from a dependency relationship between computing resource objects during a harvesting process. In some examples, computing resource objects may be data resources (e.g., data asset resources). Data asset resources are any elements (e.g., hardware, software, or a combination) configured to store data (e.g., databases, object storage, storage drives and storage drive services, block volumes, file systems, big data clusters, data or metadata repositories, data dictionaries, etc. In embodiments as described herein, a harvester application continues to add computing resource objects to a resource collection as those computing resource objects are identified. Dependencies are identified as each computing resource object is added to the resource collection. However, the dependencies are resolved only if the computing resource objects associated with those dependencies have already been added to the resource collection. If the computing resource objects associated with the dependencies have not already been added to the resource collection, then the dependency is added to an observer pool. Observer modules are configured to check each computing resource object as it is processed during the harvest process in order to match those computing resource objects to unresolved dependencies.

Embodiments provide for numerous advantages over conventional systems. For example, conventional harvesting typically involves resolving dependencies at the time of harvesting. For example, if a conventional harvester application harvests a computing resource associated with a client, the harvester application may resolve each dependency before moving on. In this example, the harvester application would identify and harvest a parent computing resources (e.g., computing resources on which the current computing resource depends) before completing the harvest of the current computing resource. This would involve searching the resource catalog 204 at least once for each identified dependency, which can create a bottleneck and delay the harvest session. Embodiments advantageously defer resolution of unresolved computing resources until the harvest session has been completed. This drastically improves efficiency as the system need only search the resource catalog once. Ideally, a resource collection would be complete by the time that the search completes. However, any unresolved computing resource dependencies can quickly be identified in this system.

FIG. 1 depicts an illustrative system in which embodiments may be implemented in accordance with various embodiments. As will be appreciated, although a Web-based environment is used for purposes of explanation, different environments may be used, as appropriate, to implement various embodiments of the illustrative system. FIG. 1 depicts an illustrative system 100 that includes at least one electronic client device 102, which can include any appropriate device operable to send and receive requests, messages or information over an appropriate network 104 and convey information back to a user of the device 102. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network may be known to one skilled in the art and will not be discussed herein in detail. Communication over the network can be enabled by wired or wireless connections and combinations thereof. In this example, the network includes the Internet, as the illustrative system includes a Web server 106 for receiving requests and serving content in response thereto, although for other networks an alternative device serving a similar purpose could be used as would be apparent to one of ordinary skill in the art.

The illustrative system includes at least one application server 108. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. As noted above, a data store is one example of a data asset resource, which, more broadly, is a type of computing resource. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 102 and the application server 108, can be handled by the Web servers 106. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The illustrative system includes an environment in one embodiment that is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature and not limiting to the scope of the disclosure.

The application servers 108 may implement a cloud platform 110. The cloud platform 110 may implement at least a service application 112 and a number of cloud server instances 114 each of which execute a client application 116. Additionally, the cloud platform 110 may include one or more computing resource objects 118. Computing resource objects may include any combination of software modules, data stores, methods, functions, procedures, etc. In accordance with some embodiments, one or more additional cloud server instances 114 may be instantiated (or spun up) or shut down as the client's demand for resources changes. Each cloud service instance 114 which is instantiated executes a client application 116 associated with a client for which the cloud service instance 114 was instantiated. Each client application 116 of a cloud server instance 114 may consume various resources of computing resource 118. In certain embodiments, techniques as described herein may be implemented within the cloud platform 110 in order to prevent inappropriate use of computing resources 118 by the client applications 116 while preventing loss of functionality and maintaining scalability.

The illustrative system 100 may utilize at least one network 104 that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

For clarity, a certain number of components are shown in FIG. 1. It is understood, however, that embodiments may include more than one of each component. In addition, some embodiments may include fewer than or greater than all of the components shown in FIG. 1. In addition, the components in FIG. 1 may communicate via any suitable communication medium (including the Internet), using any suitable communication protocol.

Figure 2:
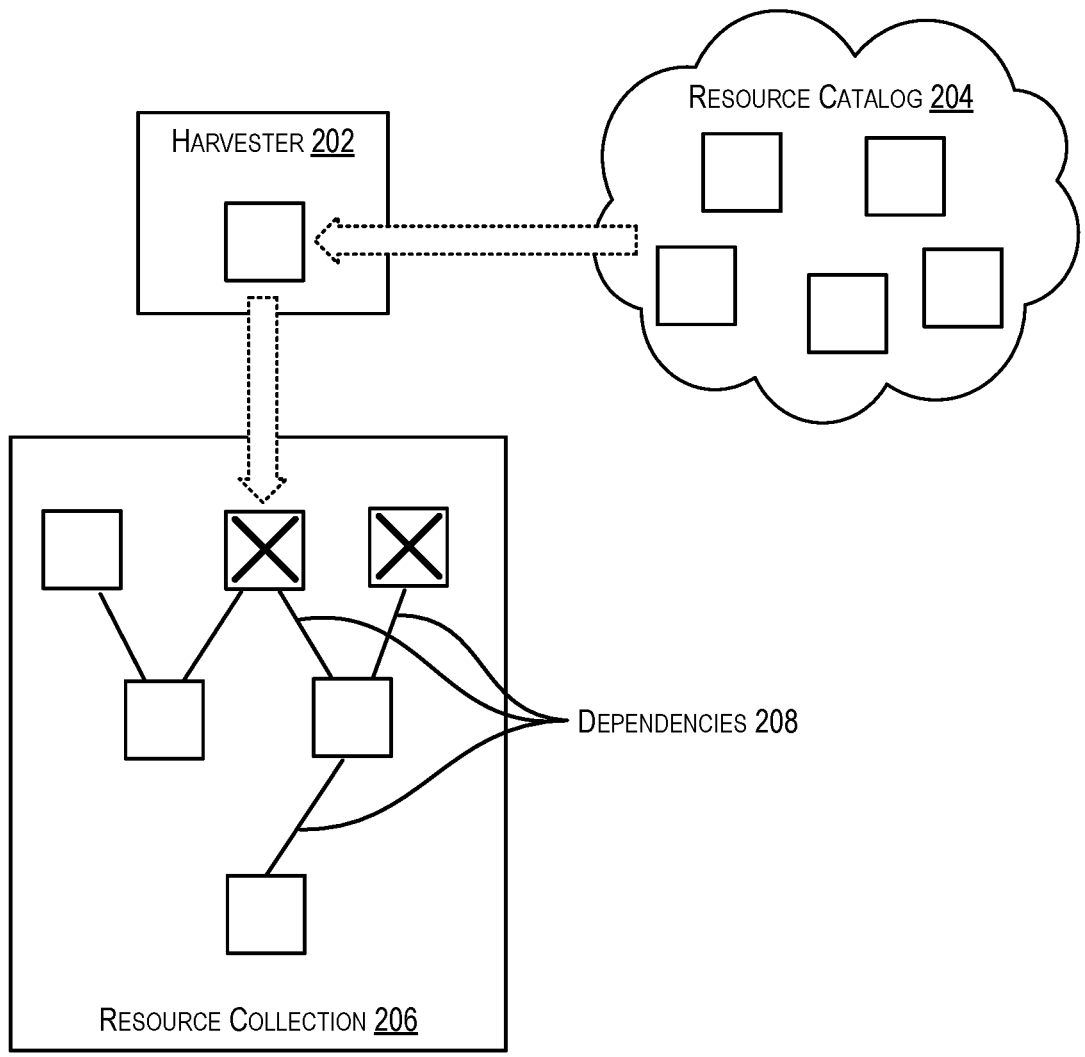
FIG. 2 depicts an illustrative process for generating a resource collection using a harvester in accordance with at least some embodiments.

FIG. 2 depicts an illustrative process for generating a resource collection using a harvester in accordance with at least some embodiments. In process 200, a harvester application 202, which may be maintained by a service provider within a cloud computing platform, provides a service in which a client is apprised of what computing resources are available to that client. To do this, the harvester application identifies resource objects available to the client within a resource catalog 204 (e.g., computing resources on the cloud computing platform) and aggregates those resources into a resource collection 206 specific to the client. In order to identify availability of resources within the resource collection 206, the harvester application 202 may additionally need to identify and resolve dependencies between the computing resources.

A harvester application 202 may be any software application configured to identify and aggregate computing resources available to a client in accordance with embodiments described herein. In some embodiments, a harvest application 202 may determine availability of a computing resource object to a client based at least in part on metadata information associated with the computing resource object and/or a service agreement associated with the client.

The resource collection 206 may be any collection of computing resources available to a client. Note that while the resource collection 206 is depicted as a dependency tree, this is merely to illustrate the dependencies 208 between various computing resource objects. A resource collection 206 may take any suitable form. For example, in some embodiments, a resource collection 206 may consist of a database table that includes information about the computing resources.

As the harvester application 202 identifies computing resource objects within the resource catalog 204 associated with the client, the harvester application 202 adds a references to that computing resource object to the resource collection 206. The harvester application 202 additionally identifies any dependencies 208 of that computing resource to other computing resources in the resource catalog 204. If dependencies 208 exist, then the harvester application 202 attempts to resolve those dependencies by linking each dependency to a corresponding computing resource object within the resource collection 206. However, if the harvester application 202 is unable to resolve the dependency, then the harvester 202 assigns the unresolved dependency to an observer pool that monitors future harvested computing resource objects. An observer thread within the harvester application 202 then resolves the dependency at a later time upon determining that a computing resource related to the unresolved dependency has been harvested. This process is described in greater detail with respect to FIG. 3 below.

Figure 3:
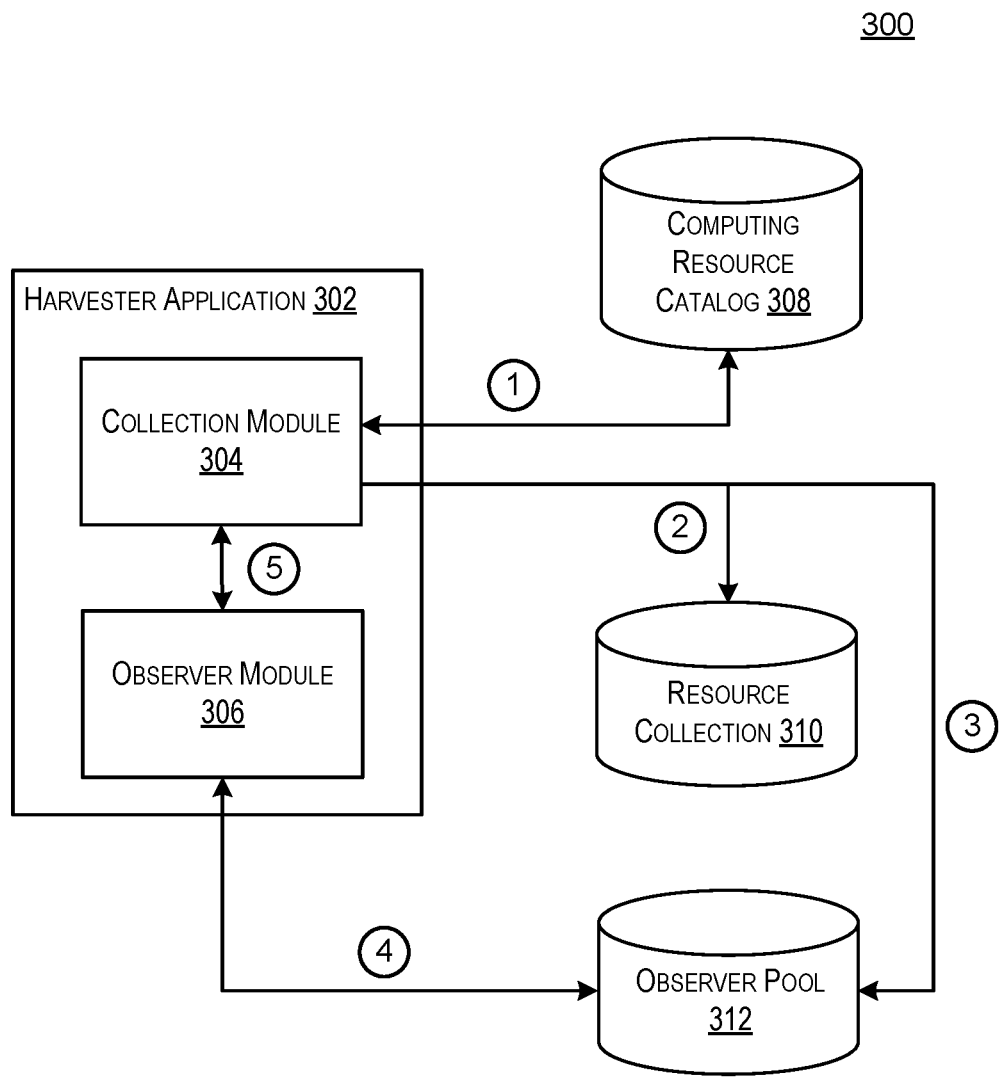
FIG. 3 depicts a block diagram illustrating an example process for harvesting a compute resource collection in accordance with at least some embodiments.

FIG. 3 depicts a block diagram illustrating an example process for harvesting a compute resource collection in accordance with at least some embodiments. In some embodiments, the process 300 may be initiated upon receiving a request from a client for a collection of compute resources related to that client. In some embodiments, the process 300 may be initiated automatically, such as on a periodic basis (e.g., hourly, daily, monthly, etc.).

In some embodiments, a harvester application 302 may include multiple modules that each provide separate functionality. For example, a harvester application 302 may include at least a collection module 304 configured to aggregate computing resources associated with a client and an observer module 306 configured to monitor harvested computing resources to resolve currently unresolved dependencies. Note that several collection modules 304 and/or observer modules 306 may be instantiated at once. For example, the harvester application 302 may implement a number of threads, each of which is implemented as a collection module 304 or observer module 306. Each of these multiple threads may operate in parallel. The harvester application may be in communication with, or have access to, a number of data stores that includes at least a pool of computing resource objects 308, a resource collection 310 associated with a client, and an observer pool 312 into which unresolved dependencies are placed.

In the process 300, the collection module 304 may identify each computing resource object in the computing resources 308 that are associated with a particular client. In some embodiments, a computing resource object of the computing resources 308 may be determined to be associated with a particular client based at least in part on metadata stored in association with the computing resource object.

Upon identifying a computing resource object associated with the client, the collection module 304 may harvest the computing resource object by adding it, or at least a reference to it, to the resource collection 310 at step 2. Additionally, the collection module 304 may determine dependencies for the computing resource object. In some embodiments, dependencies may be determined from metadata or a configuration document associated with the computing resource object. For the purposes described herein, a dependency is a relationship between computing resource objects, where one of the computing resource objects depends upon the other computing resource object for functionality. During this step, the collection module 304 captures various information about the dependency (i.e., the computing resource object upon which the current computing resource object depends for functionality), to include any identifiers (e.g., unique IDs) or identifying features (e.g., type of computing resource object, etc.). The collection module 304 then uses this captured information to determine whether the dependencies have already been harvested. If the dependencies have already been harvested and are included in the resource collection 310, then the collection module 304 records the dependency relationship and continues the harvest process. However, if a dependency is determined to be missing from the resource collection 310, then that missing dependency is added to the observer pool 312 at step 3.

In some embodiments, at least one observer module 306 may be implemented in parallel to the collection module 304 during a harvest process. The observer module 306 has access to the observer pool 312 as well as details related to any computing resource object currently being harvested by the collection module 304. While the collection module 304 continues to perform the collection part of the harvest process, and independent of the operation of the collection module, the observer module 306 may retrieve details related to unresolved dependencies in the observer pool 312 at step 4 and may monitor the computing resource objects being harvested at step 5. During step 5, the observer module 306 compares details collected by the collection module 304 to details for each of the unresolved dependencies stored within the observer pool 312. If, during step 5, the observer module 306 determines that the details collected by the collection module 304 for a computing resource object match details for an unresolved dependency in the observer pool 312, then the observer module 306 may remove the corresponding unresolved dependency from the observer pool 312 upon detecting that the computing resource object has been added to the resource collection 310. In this way, dependencies may be resolved as relevant computing resource objects are harvested. Such a system is advantageous in that the overall harvesting process is not halted in order to harvest particular dependencies, preventing the creation of a bottleneck.

Figure 4:
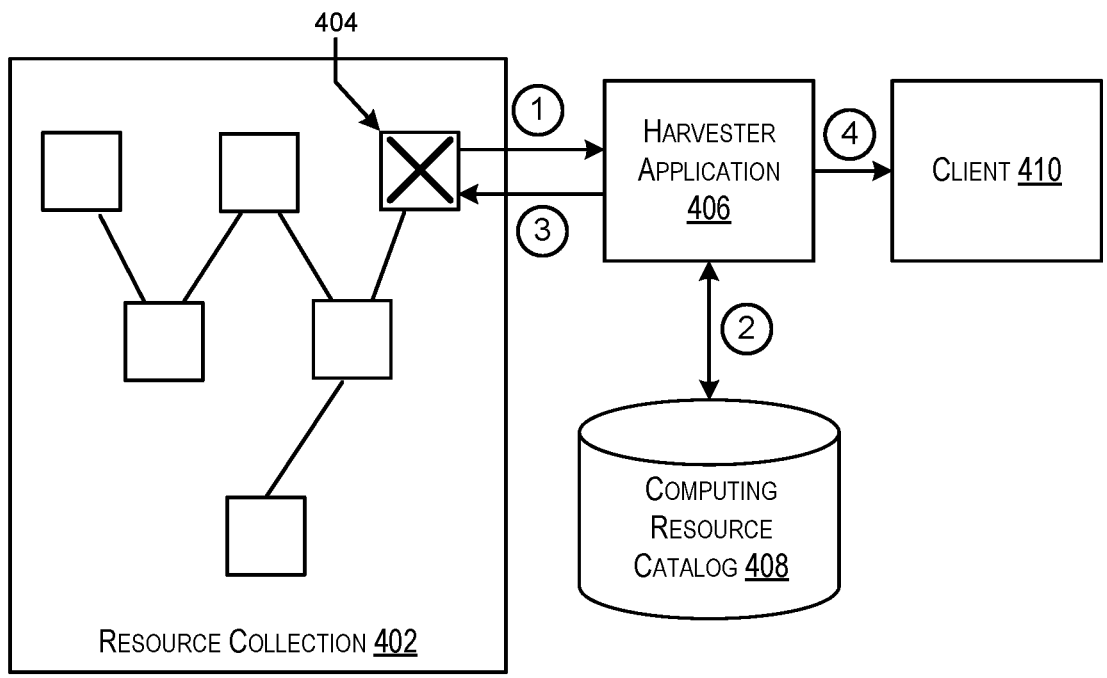
FIG. 4 depicts an illustrative process for handling unresolved references subsequent to a harvest process in accordance with at least some embodiments.

FIG. 4 depicts an illustrative process for handling unresolved references subsequent to a harvest process in accordance with at least some embodiments. More particularly, FIG. 4 depicts a process 400 that may be performed subsequent to a harvest process as described with respect to FIG. 3 above. In some embodiments, upon completion of a harvest process, a generated resource collection 402 may include one or more unresolved dependencies 404.

Upon generating the resource collection 402 via the harvest process, a harvester application 406 obtains a list of any unresolved dependencies for the resource collection 402 at step 1. At this step, the harvester application 406 may receive a number of details related to the unresolved dependencies that can be used to identify computing resource objects that match those dependencies. For example, the harvester application 406 may receive an identifier for the computing resource object, a computing resource object type, input and/or output parameters, or any other suitable information that may be used to identify the computing resource object.

In some embodiments, the harvester application 406 then attempts to resolve the unresolved dependencies 404 at step 2 by matching the number of details related to the unresolved dependencies to information stored in relation to the computing resource objects in the computing resource catalog 408. For example, the harvester application may perform a lookup query based at least in part on an identifier and/or computing resource object type. The harvester application 406 may then attempt to resolve the unresolved dependency by matching it to one or more of the returned results. If the harvester identifies a match for a computing resource object, then the unresolved dependency is resolved. If the harvester application 406 is able to resolve the unresolved dependency, then the matched computing resource object is added to the resource collection 402 at step 3. Otherwise, the unresolved dependency will remain unresolved.

In some embodiments, if the harvester application 406 detects an unresolved dependency associated with the resource collection 402, the harvester application 406 may send a notification to the client 410 at step 4 indicating the unresolved dependency.

Figure 5:
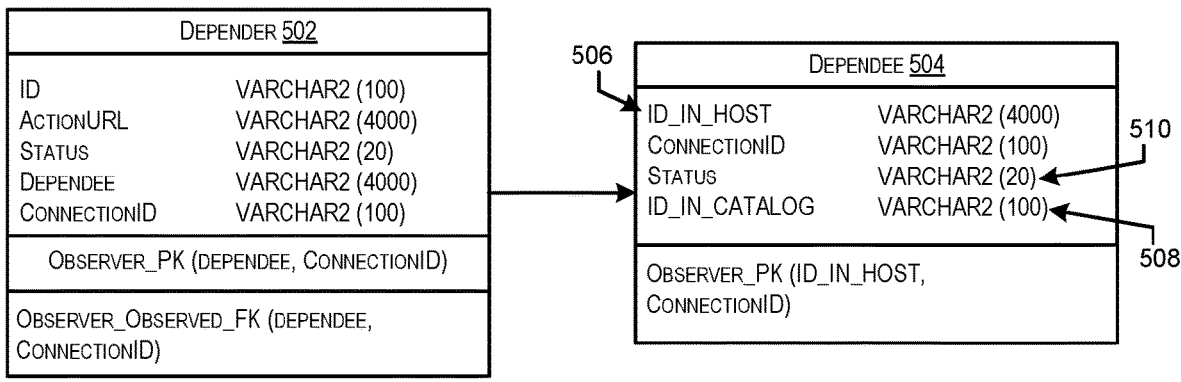
FIG. 5 depicts an example of two tables that may be implemented to store data in accordance with at least some embodiments.

FIG. 5 depicts an example of two tables that may be implemented to store data in accordance with at least some embodiments. The two tables depicted in FIG. 5 represent one potential implementation of an observer pool (e.g., observer pool 312 depicted in FIG. 3), and may include a depender table 502 and a dependee table 504. In this implementation, the depender table 502 includes information about a first computing resource object that has been harvested and which depends on at least one second computing resource object that has not yet been harvested for functionality. The dependee table 502 includes information about the at least one second computing resource object.

In some embodiments, computing resource objects are processed during a harvesting process as they are received without the need to order them or resolve references to computing resource objects that have not been added to the resource collection. When a computing resource object added to a computing resource collection (e.g., resource collection 310 depicted in FIG. 3) is dependent upon another computing resource object, various details are added to the depender table 502 and the dependee table 504 to record the unresolved dependency. It should be noted that the information may be added for any dependencies, regardless of whether they are resolved (i.e., the dependee computing resource object has already been added to the computing resource collection) or unresolved (i.e., the dependee computing resource object has not yet been added to the computing resource collection).

Each time that a harvester application identifies a computing resource object to be added to the resource collection, the harvester application (e.g., via an observer module) checks an identifier for the computing resource object to identify a match to an identifier 506 in the dependee table 504. If the harvester application identifies a match between the computing resource object being added to the resource collection and an entry in the dependee table 504, the harvester application will update an identifier 508 of the dependee table 504 to reference a location in the resource collection of the computing resource object. Additionally, a status 510 in the dependee table is updated to indicate that the dependency has been resolved. It should be noted here that while the dependee may include its own unresolved dependencies, the relationship between the current depender/dependee can be considered resolved. Additionally, it should be noted that a single dependee in the dependee table 504 may be referenced multiple times by the depender table 502, each with respect to a different depender in the depender table 502. In this way, the observer pool may store an indication of all dependencies between computing resource objects in a resource collection, as well as an indication as to whether each of those dependencies are resolved or unresolved.

By way of illustrating the interactions described herein, consider the following example. Consider a scenario in which a function Foo is imported from oracle along with its dependencies. The structure below represents the example function and its components:

Function Foo
    Input parameters p1, p2, and p3 (and their types, which could have references)
    Output or return parameter and its type
    Body of the function
    Computing resource object dependencies:
        Function Foo1 (namespace is scott.Foo1)
        Procedure Proc (namespace is fred.Proc1)
        Tables T1, T2, and T3 (namespace is fred.T1, scott.T2, and scott.T3)

Let us also assume that tables T1 and T2 are already imported into the resource collection. When Function Foo is imported into the resource collection, the references to other computing resource objects in the dependencies that have not been created (e.g., Foo1, Proc1, and T3) cannot be immediately resolved. Accordingly, Foo is created but references (using namespace and object identifier information provided) to Foo1, Proc1, and T3 are not resolved and Foo registers as an observer for these objects. Additionally, objects Foo1, Proc1, and T3 cannot be created at this time because their types are not known. The depender table 502 entry for Foo's unresolved references is shown below for this point in time:

| ID | ActionURL or roleName of reference | Status | Dependee | ConnectionID |
|---|---|---|---|---|
| /connection/123/process/345 | /connection/123/process/345/dependents or DEPENDENT | Not fixed | (Scott.Foo1) 11111 | 123 |
| /connection/123/process/345 | /connection/123/process/345/dependents or DEPENDENT | Not fixed | (Fred.Proc1) 22222 | 123 |
| /connection/123/process/345 | /connection/123/process/345/dependents or DEPENDENT | Not fixed | (Scott.T3) 33333 | 123 |

The dependee table 504 entries for Foo's unresolved references are shown below for this point in time:

| ID_IN_HOST | ConnectionID | Status | ID_in_Catalog |
|---|---|---|---|
| (Scott.Foo1) 11111 | 123 | NA | |
| (Fred.Proc1) 22222 | 123 | NA | |
| (Scott.T3) 33333 | 123 | NA | |

When Scott.Foo1 is harvested, the following steps describe how the scenario may unfold.

A look up is performed for Scott. Foo1 (e.g., by an observer module)
    Computing Resource Object Scott.Foo1 is created in the resource collection
    The reference to Scott.Foo1 in the dependee table is updated (status and ID_in_Catalog)
    An observer module is notified to fix the reference to Scott.Foo1
    The depender table is updated to reflect fixes and status.

The depender table 502 entry for Foo's unresolved references is shown below for this point in time:

| ID | ActionURL or roleName of reference | Status | Dependee | Connection ID |
|---|---|---|---|---|
| /connection/123/process/345 | /connection/123/process/345/dependents or DEPENDENT | Fixed | (Scott.Foo1) 11111 | 123 |
| /connection/123/process/345 | /connection/123/process/345/dependents or DEPENDENT | Not fixed | (Fred.Proc1) 22222 | 123 |
| /connection/123/process/345 | /connection/123/process/345/dependents or DEPENDENT | Not fixed | (Scott.T3) 33333 | 123 |

The dependee table 504 entries for Foo's unresolved references are shown below for this point in time:

| ID_IN_HOST | ConnectionID | Status | ID_in_Catalog |
|---|---|---|---|
| (Scott.Foo1) 11111 | 123 | Active | /connection/123/process/456 |
| (Fred.Proc1) 22222 | 123 | NA | |
| (Scott.T3) 33333 | 123 | NA | |

Figure 6:
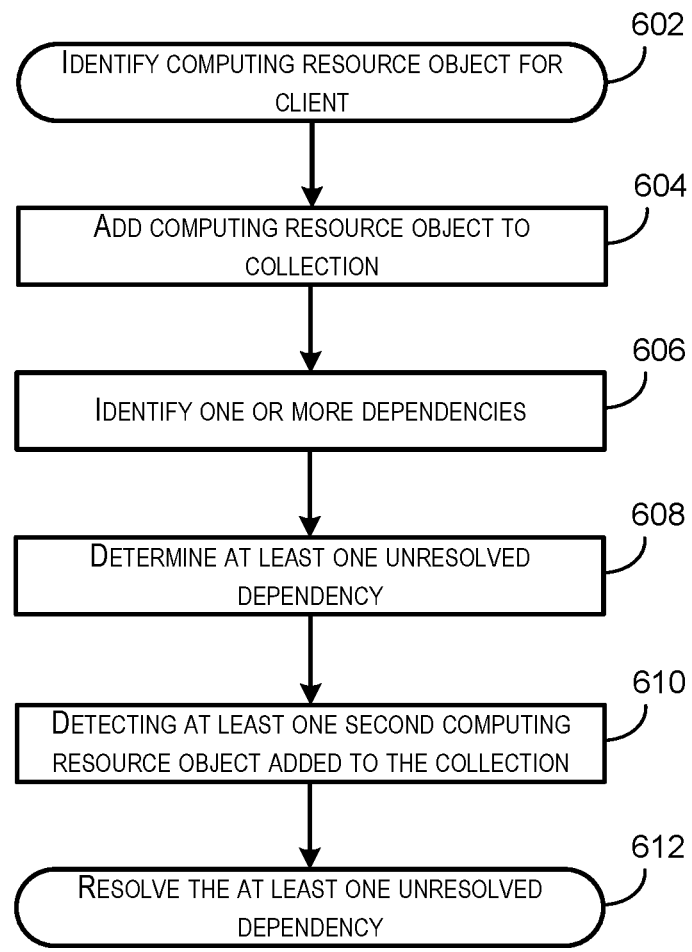
FIG. 6 depicts a flow diagram illustrating an example process for resolving dependencies between computing resource objects during a harvest process in accordance with embodiments.

FIG. 6 depicts a flow diagram illustrating an example process for resolving dependencies between computing resource objects during a harvest process in accordance with embodiments. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by one or more elements of the system described herein. For example, the process 600 may be performed by a harvester application as described with respect to FIG. 2. The code may be stored on a computer-readable storage medium, for example, in the form of a computer program including a plurality of instructions executable by one or more processors. The computer-readable storage medium may be non-transitory. The process 600 may involve generating, by a collection module of a harvester application, a computing resource collection for a client from a catalog of computing resource objects.

Process 600 begins at 602 when one or more computing resource objects are identified in association with a client. A computing resource object may be one of a software module, data store, method, function, procedure, or any other suitable computing entity. The following steps are then repeated for each computing resource object identified in association with the client. In some embodiments, the computing resource object is determined to be associated with the client based at least in part on metadata. In some embodiments, the computing resource object is determined to be associated with the client based at least in part on a service agreement.

At 604, the process 600 involves adding the identified computing resource object to a resource to a resource collection. In some embodiments, adding the computing resource object to the computing resource collection includes adding a reference to the computing resource object to the computing resource collection.

At 606, the process 600 involves identifying one or more one or more dependencies for the computing resource object. The one or more dependencies for the computing resource object may include additional computing resource objects upon which the computing resource object depends for at least some functionality.

At 608, the process 600 involves determining at least one unresolved dependency from the one or more dependencies. The at least one unresolved dependency may include an additional computing resource object of the additional computing resource objects that is not currently included in the computing resource collection. In some embodiments, this may involve identifying a dependency on the at least one second computing resource object, and wherein the at least one second computing resource object is not in the computing resource collection when the computing resource object is added to the computing resource collection. The collection module may obtain a number of details associated with the at least one unresolved dependency.

At 610, the process 600 involves detecting at least one second computing resource object added to the resource collection associated with the unresolved dependency to the computing resource collection. In some embodiments, detecting that the collection module has added the at least one second computing resource object associated with the unresolved dependency to the computing resource collection involves matching a number of details associated with the at least one second computing resource object to a number of details associated with the at least one unresolved dependency. In some embodiments, the number of details comprise at least one of a computing resource object identifier or a computing resource object type. The at least one unresolved dependency may be recorded in an observer pool. In some embodiments, such an observer pool includes mappings of dependencies between computing resource objects. In some embodiments, an observer pool comprises at least two database tables, wherein one of the at least two database tables stores a record of dependees and the other of the at least two database tables stores a record of dependenders.

At 612, the process 600 involves resolving the at least one unresolved dependency upon determining that the at least one second computing resource object is the dependee of the at least one unresolved dependency. In some embodiments, resolving the unresolved dependency involves updating a status of the unresolved dependency to indicate that it is resolved. In some cases, the process may further involve notifying the client of at least one additional unresolved dependency.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
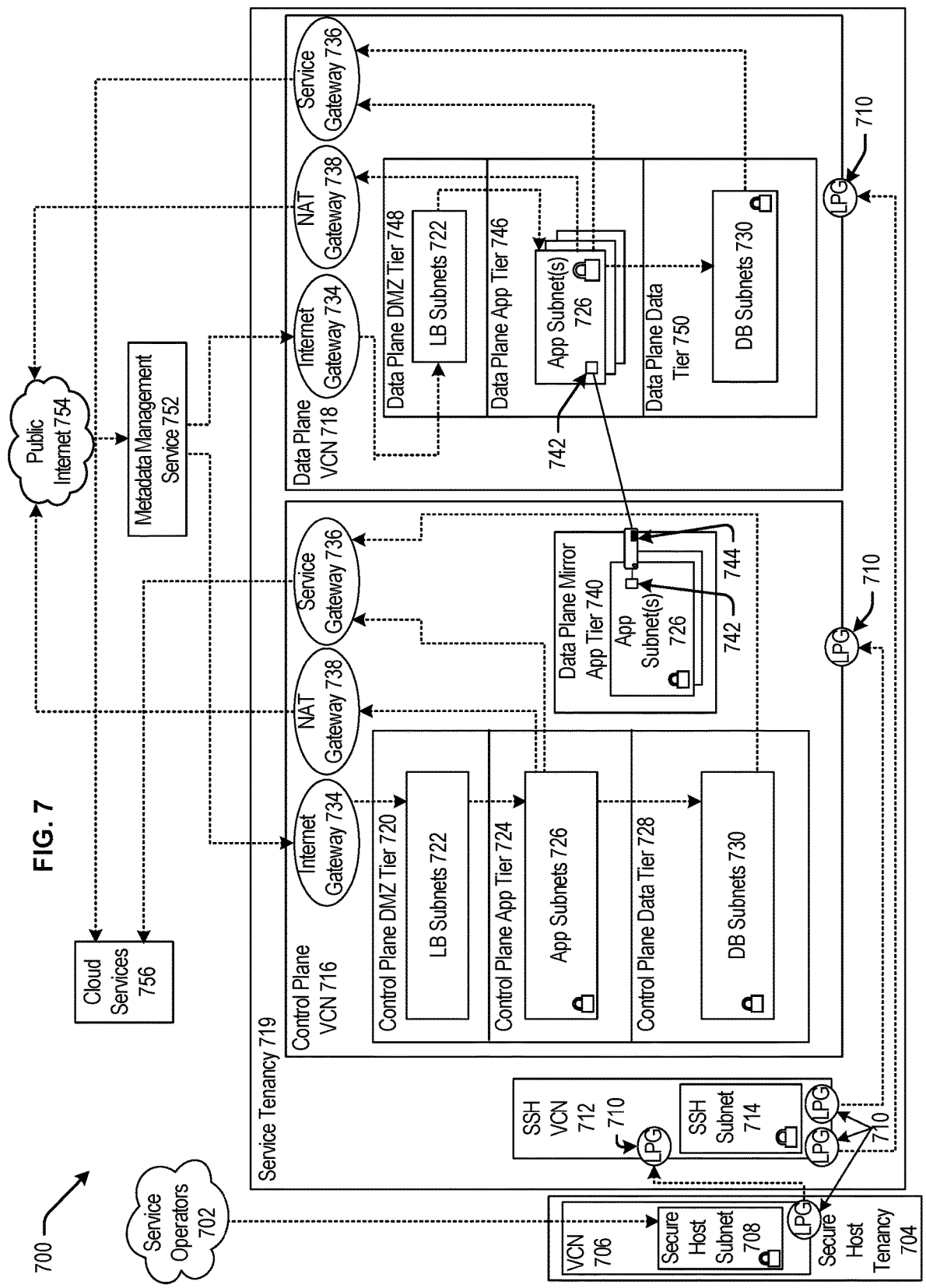
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
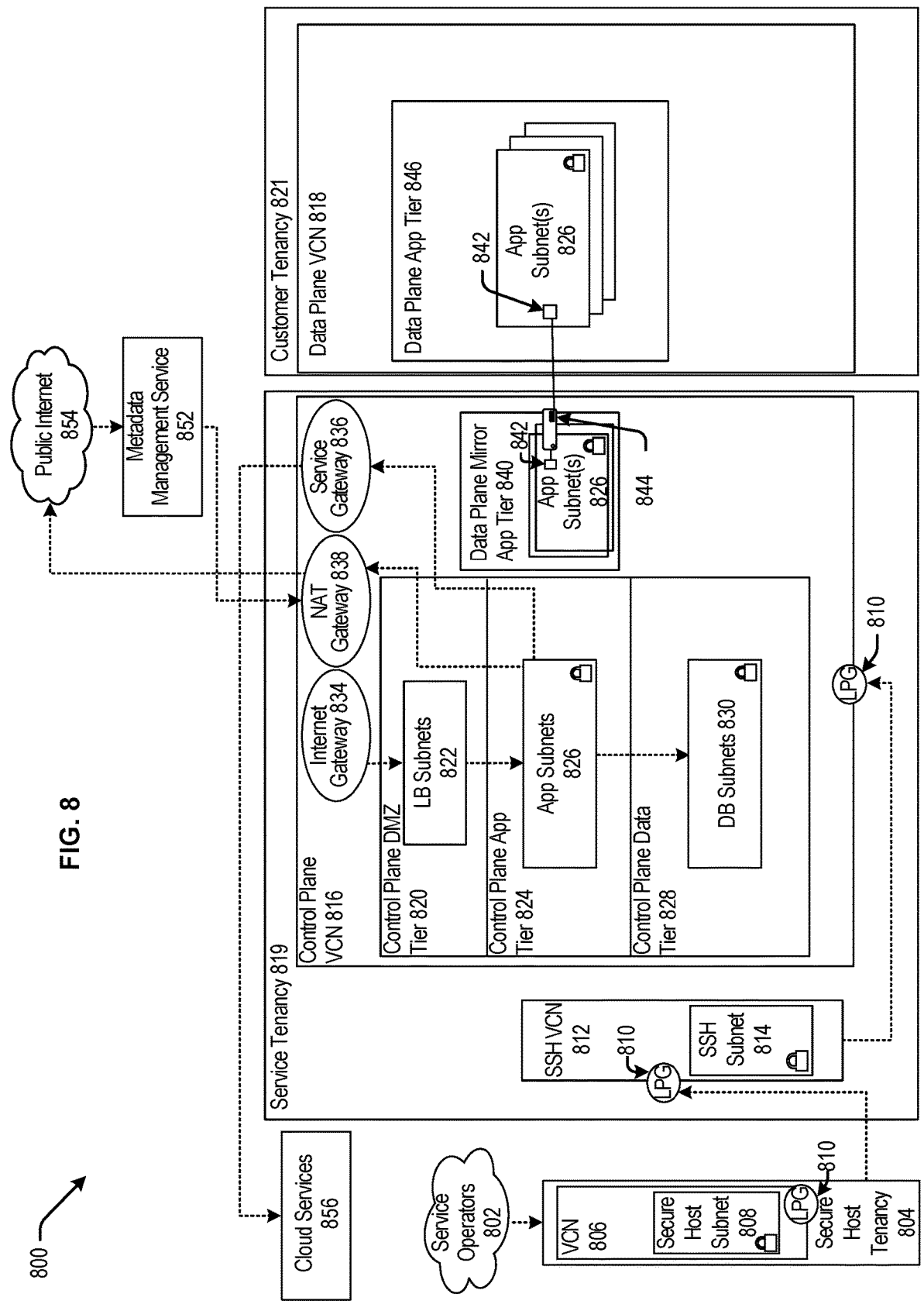
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
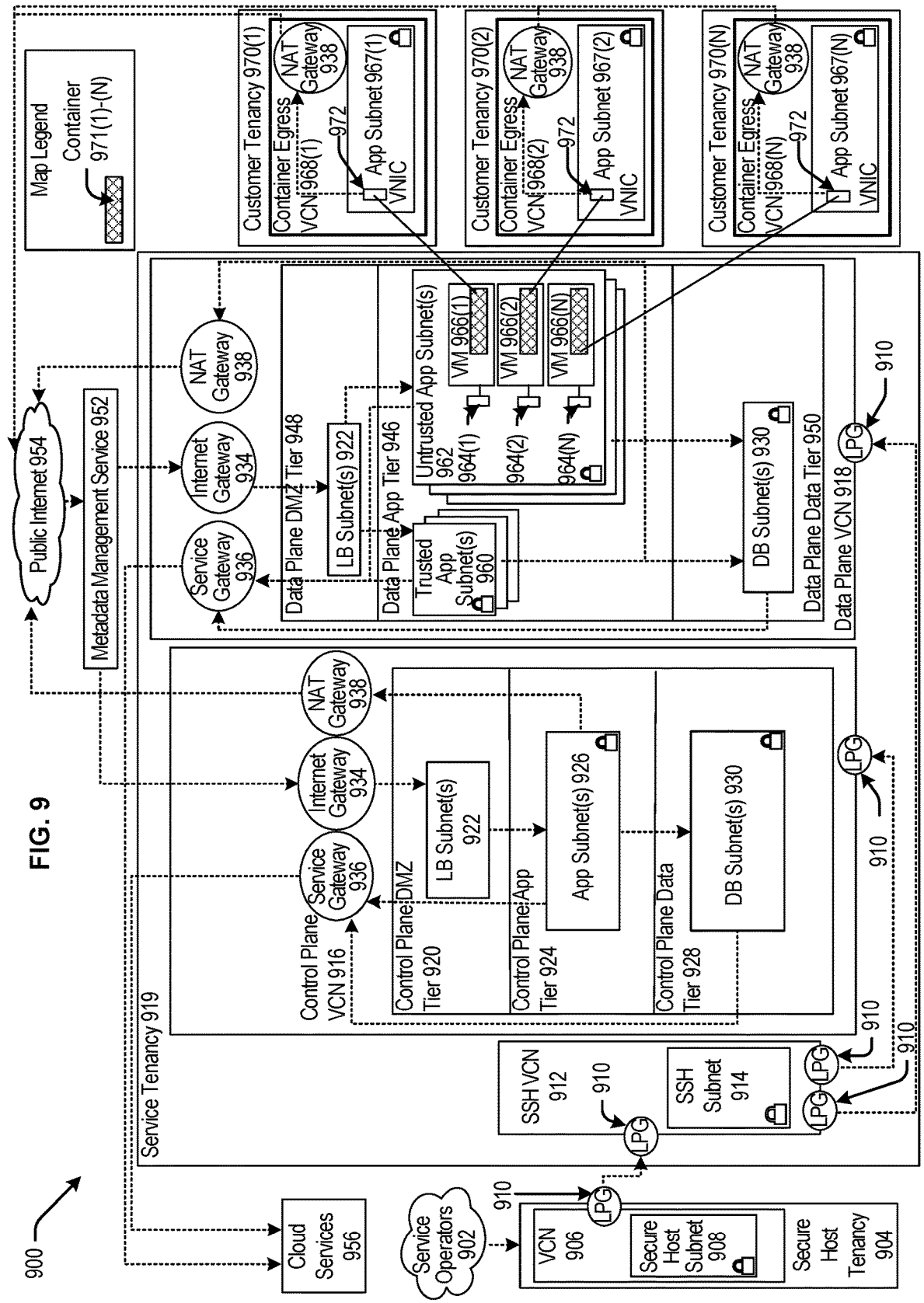
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
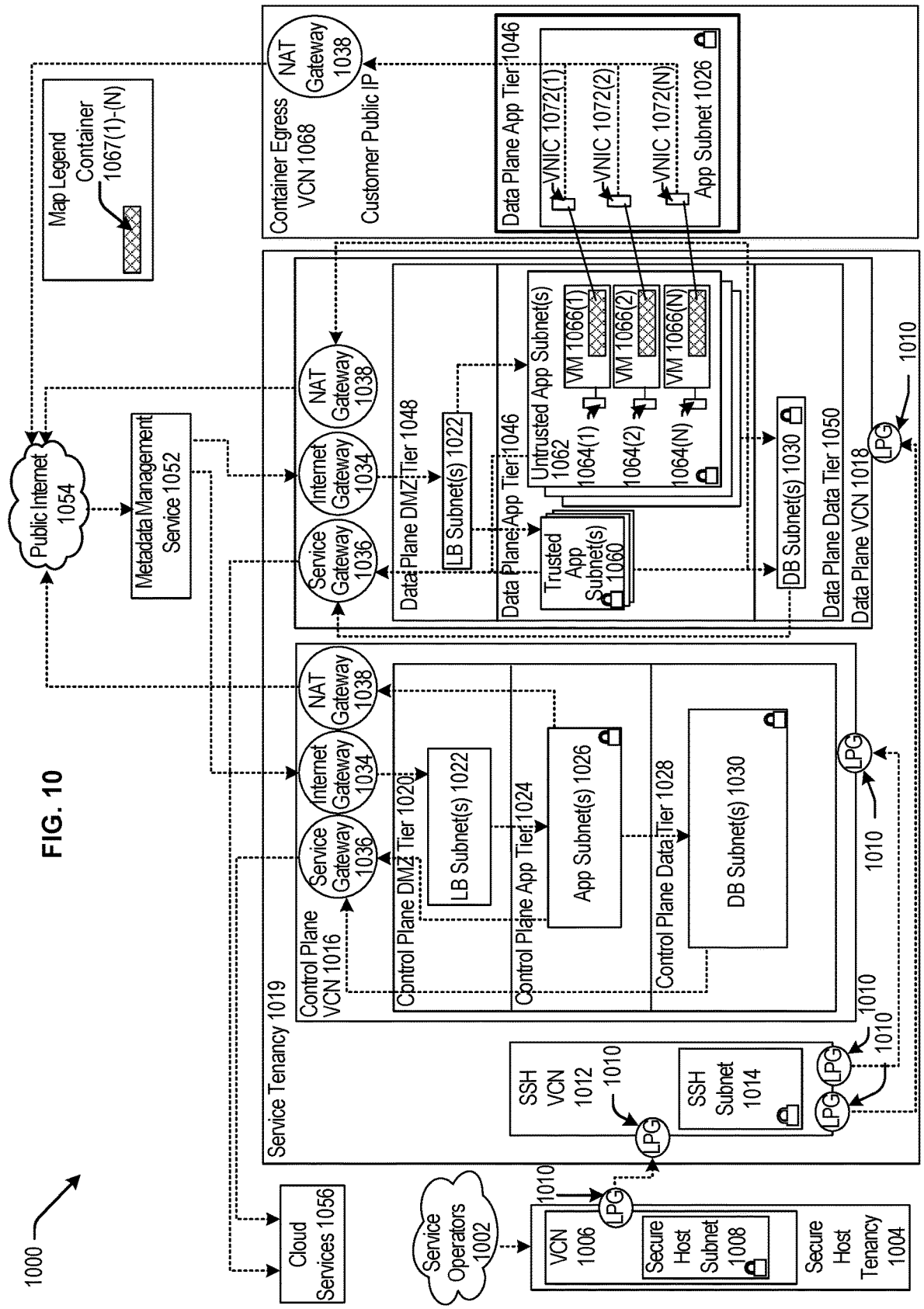
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012

(e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
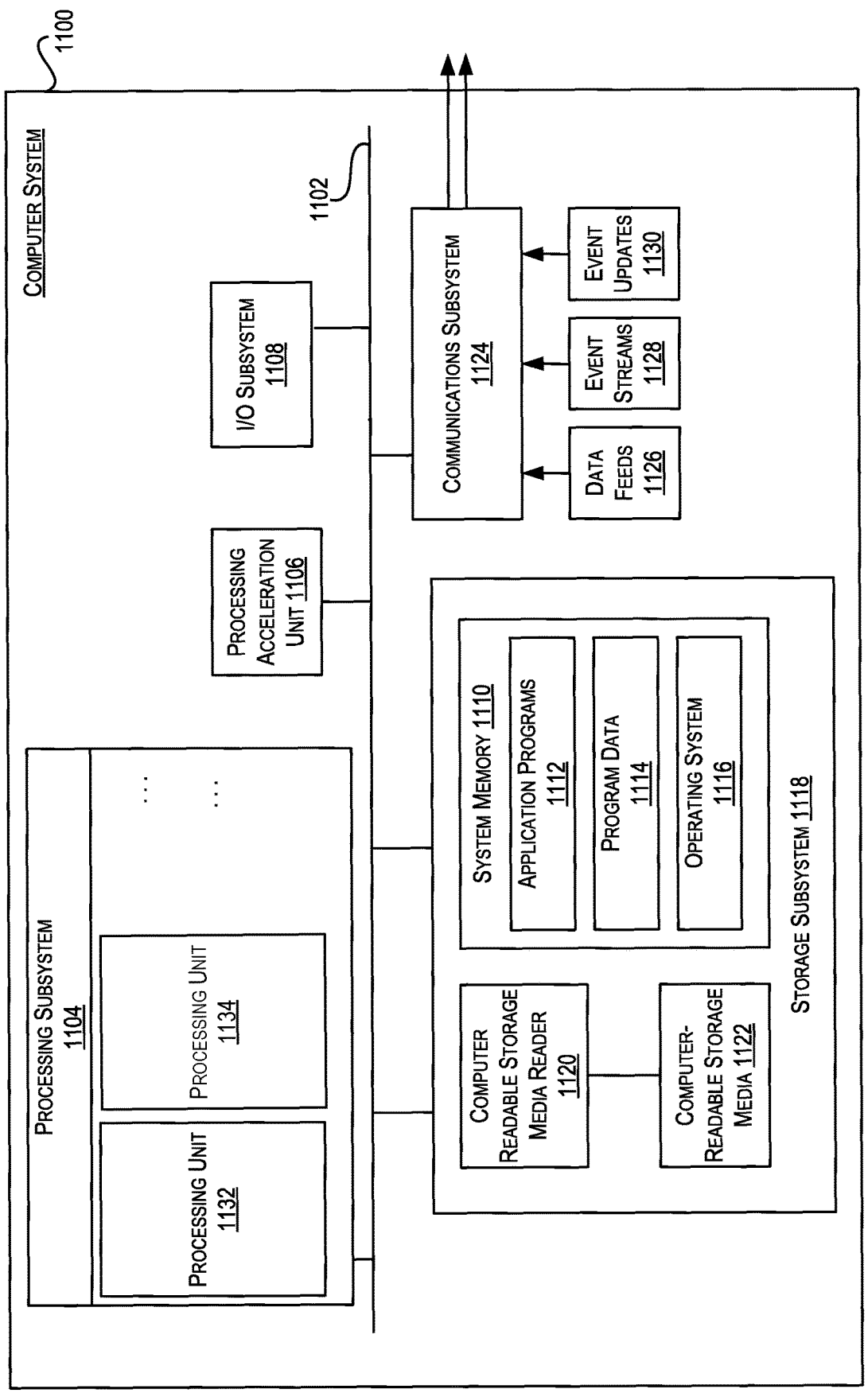
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
generating, by a collection service of a harvester application, a computing resource collection for a client from a catalog of computing resource objects by, for each computing resource object in the catalog of computing resource objects upon determining that the computing resource object is associated with the client:
adding the computing resource object to the computing resource collection;
identifying one or more dependencies for the computing resource object;
determining at least one unresolved dependency from the one or more dependencies, the at least one unresolved dependency including a particular dependency on a second computing resource object, the second computing resource object outside of the computing resource collection;
adding a third computing resource object to the computing resource collection;
responsive to the third computing resource object being different from the second computing resource object:
maintaining the at least one unresolved dependency for the computing resource object in an unresolved state; and
responsive to the third computing resource object corresponding to the second computing resource object:
resolving, by an observer module of the harvester application, the at least one unresolved dependency upon detecting that the collection service has added the second computing resource object associated with the unresolved dependency to the computing resource collection.

2. The method of claim 1, wherein adding the computing resource object to the computing resource collection comprises adding a reference to the computing resource object to the computing resource collection.

3. The method of claim 1, wherein the collection service obtains a first number of details associated with the at least one unresolved dependency.

4. The method of claim 3, wherein detecting that the collection service has added the second computing resource object associated with the unresolved dependency to the computing resource collection comprises matching a second number of details associated with the second computing resource object to the first number of details associated with the at least one unresolved dependency.

5. The method of claim 3, wherein the first number of details comprise at least one of a computing resource object identifier or a computing resource object type.

6. The method of claim 1, wherein determining at least one unresolved dependency from the one or more dependencies comprises identifying a dependency on the second computing resource object, and wherein the second computing resource object is not in the computing resource collection when the computing resource object is added to the computing resource collection.

7. The method of claim 1, wherein resolving the unresolved dependency comprises updating a status of the unresolved dependency to indicate that it is resolved.

8. The method of claim 1, wherein the at least one unresolved dependency is recorded in an observer pool.

9. The method of claim 8, wherein the observer pool includes mappings of dependencies between computing resource objects.

10. The method of claim 9, wherein the observer pool comprises at least two database tables, wherein one of the at least two database tables stores a record of dependees and another of the at least two database tables stores a record of dependers.

11. A computing device comprising:
a processor; and
a memory including instructions that, when executed with the processor, cause the computing device to, at least:
generate a computing resource collection for a client from a catalog of computing resource objects by, for each computing resource object in the catalog of computing resource objects upon determining that the computing resource object is associated with the client:
adding the computing resource object to the computing resource collection;
identifying one or more dependencies for the computing resource object;
determining at least one unresolved dependency from the one or more dependencies, the at least one unresolved dependency including a particular dependency on a second computing resource object, the second computing resource object outside of the computing resource collection;
adding a third computing resource object to the computing resource collection;
responsive to the third computing resource object being different from the second computing resource object:
maintaining the at least one unresolved dependency for the computing resource object in an unresolved state; and
responsive to the third computing resource object corresponding to the second computing resource object:
resolving the unresolved dependency upon detecting that a collection service has added the second computing resource object associated with the unresolved dependency to the computing resource collection.

12. The computing device of claim 11, wherein the one or more dependencies for the computing resource object comprise additional computing resource objects upon which the computing resource object depends for at least some functionality.

13. The computing device of claim 12, wherein the at least one unresolved dependency comprises an additional computing resource object of the additional computing resource objects that is not currently included in the computing resource collection.

14. The computing device of claim 11, wherein the computing resource object is determined to be associated with the client based at least in part on at least one of metadata or a service agreement.

15. The computing device of claim 11, wherein the instructions further cause the computing device to notify the client of the at least one dependency for the computing resource object in the unresolved state.

16. The computing device of claim 11, wherein the at least one unresolved dependency is recorded in an observer pool.

17. The computing device of claim 16, wherein the observer pool comprises at least one database table.

18. A computer-readable storage medium having stored thereon computer-executable instructions that, when executed by at least one processor of a computing device, causes the at least one processor to perform operations comprising:
generating a computing resource collection for a client from a catalog of computing resource objects by, for each computing resource object in the catalog of computing resource objects upon determining that the computing resource object is associated with the client:
adding the computing resource object to the computing resource collection;
identifying one or more dependencies for the computing resource object;
determining at least one unresolved dependency from the one or more dependencies, the at least one unresolved dependency including a particular dependency on a second computing resource object, the second computing resource object outside of the computing resource collection;
adding a third computing resource object to the computing resource collection;
responsive to the third computing resource object being different from the second computing resource object:
maintaining the at least one unresolved dependency for the computing resource object in an unresolved state; and
responsive to the third computing resource object corresponding to the second computing resource object:
resolving the at least one unresolved dependency upon detecting that collection service has added the second computing resource object associated with the unresolved dependency to the computing resource collection.

19. The computer-readable storage medium of claim 18 wherein the at least one unresolved dependency is recorded in a database table storing mappings of dependencies between computing resource objects.

20. The computer-readable storage medium of claim 18 wherein the one or more dependencies for the computing resource object comprise additional computing resource objects upon which the computing resource object depends for at least some functionality.

* * * * *